Figure 1:
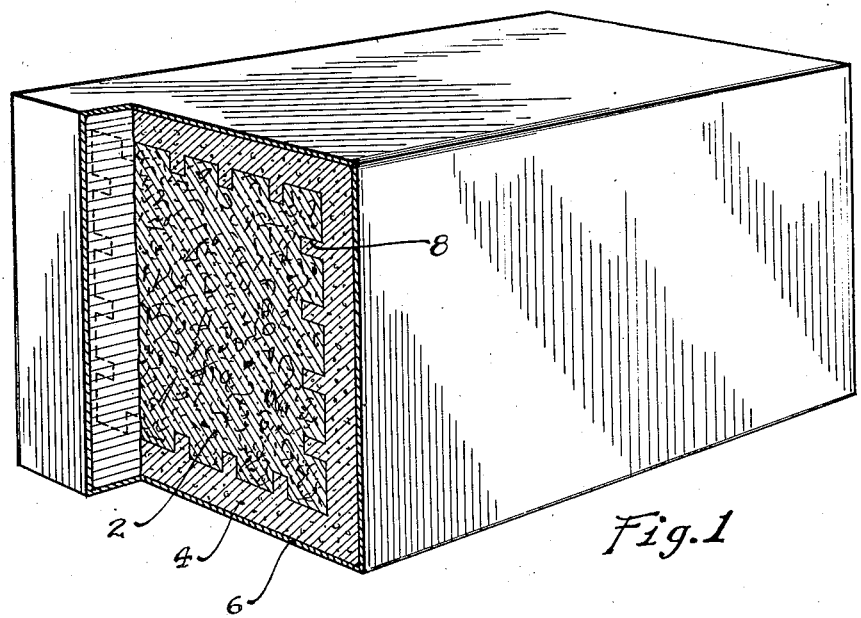

March 5, 1935. C. H. PARSONS 1,993,621

METHOD OF PREPARING A MEAT CHEESE LOAF

Filed July 23, 1932

Clinton Henry Parsons
INVENTOR

BY
ATTORNEY

Patented Mar. 5, 1935

1,993,621

UNITED STATES PATENT OFFICE 1,993,621

METHOD OF PREPARING A MEAT CHEESE LOAF

Clinton H. Parsons, Chicago, Ill., assignor to Swift and Company, Chicago, Ill., a corporation of Illinois Application July 23, 1932, Serial No. 624,235

5 Claims. (Cl. 99—11)

The present invention relates to food products, and more in particular to a meat-cheese product and method of preparing the same.

This application is a continuation in part of my application entitled "Method of preparing meat cheese loaf and the product thereof"—Serial No. 550,575, filed July 13, 1931.

Among the objects of the present invention is to provide a novel food product comprising a body of meat provided with a covering or coating of cheese conforming and suitably anchored to the body of meat whereby the same is held in place both during the shipping and handling of the product, as well as during the slicing of the same.

The invention comprehends the idea of providing a novel food product comprising a body of meat having a covering of cheese thereover to which a foil wrapper is caused to adhere for protecting and preserving the cheese coating.

Another object of the invention is to provide a novel food product comprising a body of meat having its surface area increased for effectively causing a coating or covering of cheese to adhere thereto, the meat being particularly well preserved by this coating or covering and the attractiveness of the product enhanced by the positive adherence of the cheese to the meat body; evidenced, as for example, during the slicing of the product. More particularly, one aspect of the invention contemplates the idea of grooving the body of the meat, or otherwise providing the same with recesses or indentures, for increasing the surface area of the body of meat and to provide better anchorage for the cheese covering or coating.

Another object of the invention is to provide a method for treating product of this character whereby the surface of the meat block is heated before submerging in the cheese, thus drying the surface of the meat and preventing surface peeling of the cheese at the junction of the meat.

Another object of the invention is to provide a method for better binding of the cheese with the meat wherein the product, after packaging and before cooling, is preheated.

Other objects, features, capabilities, advantages and method steps are comprehended by the invention, as will later appear, and as are inherently possessed thereby.

Figure 2:
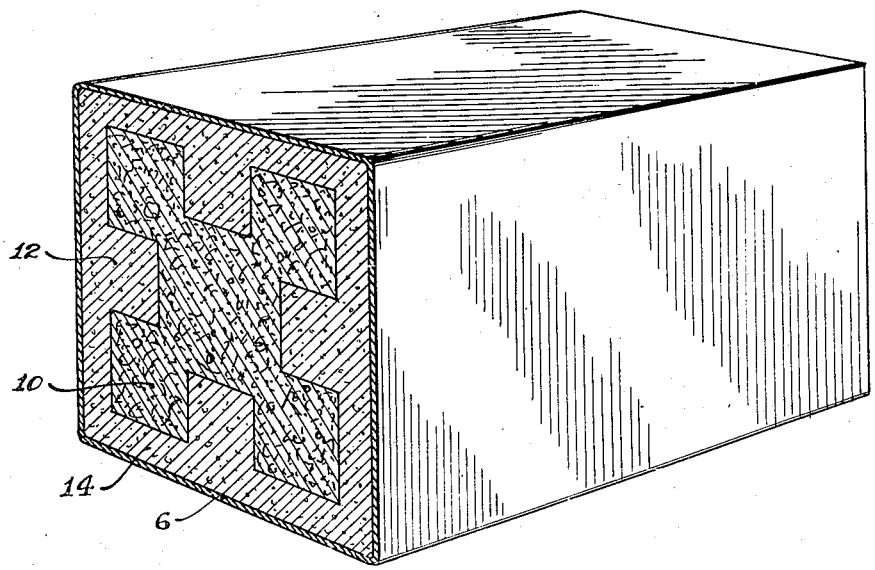

Referring to the drawing:

Figure 1 is a view in perspective of a food product and disclosing the same in cross-section as made in accordance with the present invention; and Figure 2 is a view in perspective of a food product and disclosing in cross-section another embodiment as made in accordance with the present invention.

Referring now more in detail to the drawing, an embodiment selected to disclose the present invention is shown as comprising a central body of meat 2 enclosed or encased in a body, coating or layer of cheese 4 having a wrapper of foil or the like 6 adhering to its outer or exterior surface.

The body of meat 2 may comprise a solid piece of suitable size properly cooked and seasoned, as by the addition of condiments during the preparing of the same to make it edible and appetizing, or the same may comprise a meat loaf formed into a body of any desired shape from comminuted particles of meat which may be cooked either before or after the formation of the loaf, it, of course, being understood that condiments or other ingredients may be added to the comminuted meat particles, as desired.

This body of meat 2 has its surfaces grooved, as at 8, or otherwise contoured to increase the surface area thereof to provide a greater adhering surface for the cheese coating or covering 4, the grooves 8 providing means for anchoring the cheese body or covering to the surface of the body of meat 2. In practice, the grooves may be formed in the surface of the meat, as by passing the body of meat over a plurality of saws extending or protruding above a saw table, or the grooves may be formed, as for example, by pressing the body of meat.

After the body of prepared meat has been grooved, as indicated, the same may be caused to be coated with the body of cheese 4, this coating being effected in any suitable or desirable manner. In order to protect and preserve the cheese coating, the tinfoil 6 is caused to adhere thereto.

In actual practice, several suitable ways have been found to coat the body of meat with cheese and to cause the foil wrapper to adhere to the surface. As for example, a mold or container may be lined with the foil 6, after which a plastic body of cheese of the desired quantity may be poured therein, so that when the body of meat is inserted into the cheese, the cheese will surround the meat body. The foil may then be folded around the cheese. The cheese is preferably in the form of an emulsified warm plastic composition adapted to readily conform to the grooved surface of the meat body and upon cooling is effectively anchored therein, the foil likewise adhering to the cheese covering upon cooling of the same.

If desired, sliced pieces of cheese may be positioned in contiguous relation about the meat body, the foil wrapped therearound, and the entire product heated to cause the cheese to flow into the grooved surface of the meat body and adhere to the foil. Any other way may be employed for coating or covering the meat body within the scope of the invention.

In Figure 2 of the drawing is disclosed a modification of the present invention in which the meat body 10 is provided with an enlarged groove 12 on each side thereof, thus increasing the surface area thereof for anchorage of the cheese coating 14. Further, the enlarged groove 12 gives the meat body 10 an entirely different configuration than that disclosed in Figure 1 of the drawing, and it is to be understood that the configuration of the meat body may be changed or varied without departing from the spirit of the invention. As in the previously described embodiment, the cheese covering is wrapped in a foil wrapper 16 for protecting and preserving the same. Also, either one or both of the above methods, or others, may be used for covering the meat with the cheese covering.

It will be readily appreciated from the above disclosure that a novel food product is effected wherein the meat is particularly well preserved by the cheese covering and wherein the covering is effectively anchored to the meat body.

In the manufacture of certain types of this product, as for example, where the central meat block is composed of ham which contains a high moisture content, I have found that better results are secured if the meat block is preheated before submersion in the cheese, and submerged while the surface of the meat block is dry and warm. I have further found that, although increasing the surface area of the meat block, as heretofore described, decreases the likelihood that the cheese will fall away from the meat in slicing, better adherence may be secured by heating the packaged product in an oven. In actual practice I have found that the best results are secured by first grooving the meat and then submerging the meat in the cheese in a tinfoil lined mold as more particularly described in my Patent No. 1,721,406, entitled "Meat cheese loaf and method of preparing same" which was granted July 16, 1929, on the method and product of which this present application is an improvement.

In the case of ham or moist meats of that character, I, of course, prefer to dry and warm the surface of the meat block, as has been previously described, before submergence. After the package is formed, I convey the product, while still hot, to an oven and hold the package in the oven at a temperature of about 225° F. for a period of from five minutes to one-half hour, depending upon the type of product. This additional heating serves to render the cheese more mobile and permits the liquid cheese to run into the grooves and penetrate the fibers of the meat over the entire surface.

This treatment results in a product in which the meat and cheese cling so tightly that subsequent shrinkage and contraction of the meat is followed by the cheese which does not fall away from the meat even under the action of a slicing machine.

The invention comprehends other characteristics, as will later appear and are inherently possessed thereby, and while I have herein described and upon the drawing shown illustrative embodiments of the invention, it is to be understood that the invention is not limited thereto, but may comprehend other constructions, arrangements of parts, method steps, details and features, without departing from the spirit of the invention.

Having thus disclosed the invention, I claim:

1. The method of preparing a meat-cheese product, comprising the steps of forming grooves in the surface of a body of meat, drying the surface of the meat by heat treatment and thereafter covering the body of meat with a plastic cheese body adapted to conform to the grooved surface contour of said body of meat and adhere thereto in the form of a layer.

2. The method of preparing a meat-cheese product, comprising the steps of forming grooves in the surface of a body of meat, drying the surface of said body of meat by raising the temperature thereof, and while said body of meat is warm, covering with a plastic cheese body adapted to conform to the grooved surface contour of said body of meat and adhere thereto in the form of a layer.

3. The method of preparing a meat-cheese product, comprising the steps of forming grooves in the surface of a body of meat, drying the surface of said body of meat by raising the temperature thereof, covering said body of meat with a plastic cheese body adapted to conform to the grooved surface contour of said body of meat and adhere thereto in the form of a layer, causing a wrapper or foil to adhere to the outer surface of said cheese during the conforming of said cheese to the surface of said body of meat and then heating in an oven sufficiently to cause the cheese to become mobile and penetrate the grooves and the fibers of the meat.

4. The method of preparing a meat-cheese product, comprising the steps of forming grooves in the surface of a body of meat, drying the surface of said meat by heat treatment, covering said body of meat with a plastic cheese body adapted to conform to the grooved surface contour of said body of meat and adhere thereto in the form of a layer, causing a wrapper or foil to adhere to the outer surface of said cheese during the conforming of said cheese to the surface of said body of meat and then heating in an oven sufficiently to cause the cheese to become mobile and penetrate the grooves and the fibers of the meat.

5. The method of preparing a meat-cheese product, comprising the steps of forming indentures in the surface of a body of meat, drying the surface of said body of meat by raising the temperature thereof, and while said body of meat is warm, covering with a plastic cheese body adapted to conform to the indentured surface contour of said body of meat and adhere thereto in the form of a layer.

CLINTON H. PARSONS.